Dec. 21, 1937.     S. A. BOKOVOY     2,102,783
CONSTANT TEMPERATURE APPARATUS
Filed Jan. 31, 1936     3 Sheets-Sheet 1
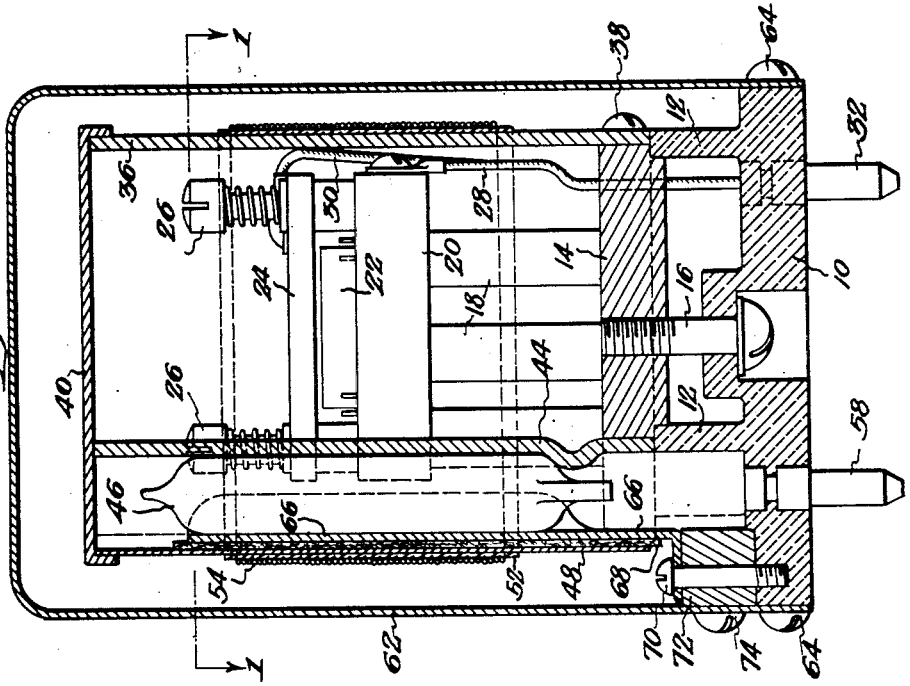
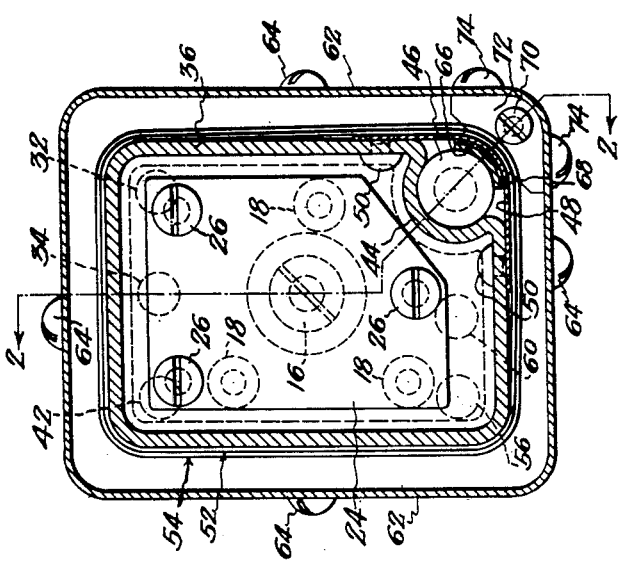
Inventor
Samuel A. Bokovoy
by J. Huff
Attorney.

SINGLE HEATER CONTROL WITHOUT AMBIENT THERMAL COMPENSATION

Inventor
Samuel A. Bokovoy
by J. Huff
Attorney.

Dec. 21, 1937.        S. A. BOKOVOY        2,102,783
CONSTANT TEMPERATURE APPARATUS
Filed Jan. 31, 1936        3 Sheets-Sheet 3
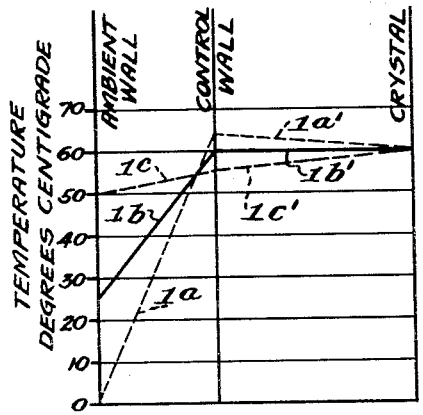
SINGLE HEATER CONTROL WITH AMBIENT THERMAL
COMPENSATION REGULATING THE CONTROL THERMALLY
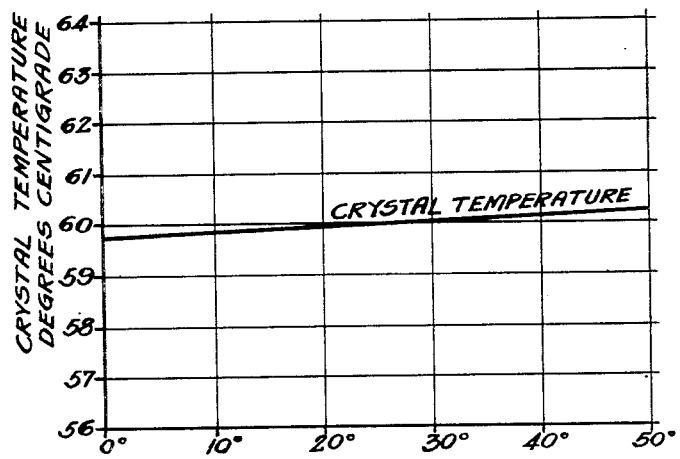
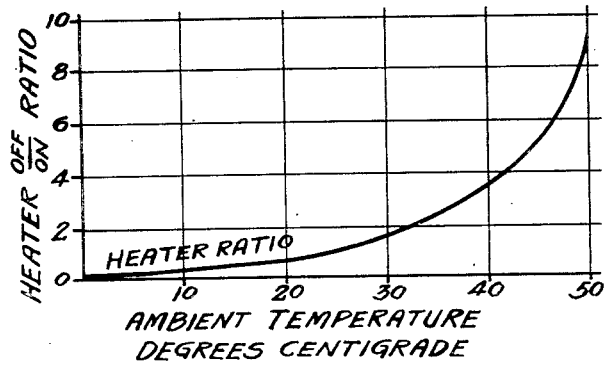
Inventor
Samuel A. Bokovoy
by
Attorney.

Patented Dec. 21, 1937

2,102,783

UNITED STATES PATENT OFFICE 2,102,783

CONSTANT TEMPERATURE APPARATUS

Samuel A. Bokovoy, Audubon, N. J., assignor to Radio Corporation of America, a corporation of Delaware Application January 31, 1936, Serial No. 61,834

4 Claims. (Cl. 219—19)

This invention relates to constant temperature cabinets, particularly to cabinets designed for use in connection with frequency control apparatus and has special reference to housings for piezo-electric oscillators, resonators and the like.

The prior art is replete with heated containers designed to maintain a constant interior temperature irrespective of temperature variations in the ambient medium. Usually two or more containers are provided, nested one within another. Thus, it has previously been proposed to maintain a piezo-electric crystal at a satisfactory operating temperature by enclosing it in the innermost of a series of casings composed of materials having different thermal characteristics (such for instance as wood and aluminum) to distribute the heat, and by providing closely packed alternate layers of, say, copper and felt between the several casings to also distribute the heat and attenuate temperature variations. Irrespective of the advantages claimed for such devices, it may be said generally that they are cumbersome, expensive, and do not permit of ready assembly nor provide ready access to the interior for inspection and repair. Attempts to simplify the construction have heretofore resulted in failure since obviously the efficiency of a device of this type is a function of the number of containers in the nest and the amount and quality of the insulating substance between, or constituting, the several chambers.

A principal object, therefore, of the present invention is to provide an extremely accurate, compact, inexpensive, simple and trouble-free, constant temperature cabinet.

Another object of the invention is to provide a constant temperature control cabinet characterized by an economy of parts and one that lends itself readily to mass production methods.

Another object of the invention is to provide a temperature control cabinet and a thermal ambient compensator therefor, capable of maintaining a temperature varying less than ½° C. for an ambient variation of 50° C.

The above and other objects are accomplished in accordance with the invention by providing an assembly or "nest" of but two containers or casings. The piezo-electric or other element is mounted within the inner container and a thermo-regulator is arranged in a novel manner within the wall thereof. The outer casing is spaced from the inner container but is connected (as by means of a metallic strip of suitable material and mass) to the thermo-regulator, i. e. it is in heat transfer relation therewith. The regulator itself is thus permitted to suffer a variation in temperature corresponding to a variation in the ambient so that operation of the thermo-regulator is dependent directly rather than indirectly upon changes in the thermal ambient.

Certain details of the construction together with other objects and advantages will be apparent and the invention itself will be best understood by reference to the following description and to the accompanying drawings, wherein:

Figure 1 is a sectional plan view taken on the line 1—1 of Fig. 2, and Fig. 2 is a sectional elevation taken on the line 2—2 of Fig. 1, showing a constant temperature apparatus including an ambient thermal compensator positioned in accordance with the invention.

Figs. 3, 4, 5 and Figs. 6, 7, 8 are, respectively, series of comparative charts indicative of certain operating characteristics of the device of Figs. 1 and 2 without, and with, the ambient thermal compensator of the invention.

Figure 3:
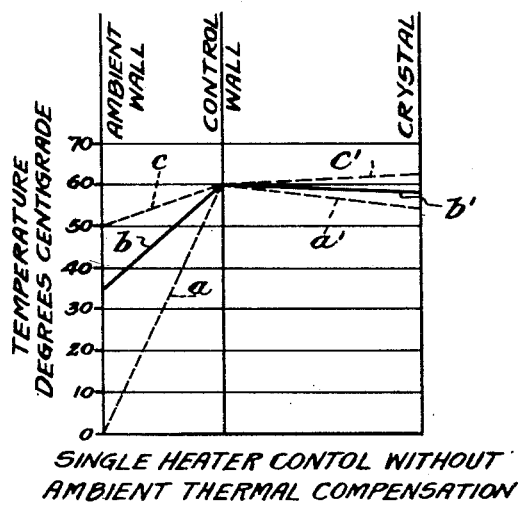

Referring to Figs. 1 and 2, a base 10 of bakelite or the like is provided with a plurality of upwardly extending risers 12 which support an inner base 14 which is preferably of metal and is conveniently anchored to the risers by means of a screw 16 counter-sunk in the lower base 10. Base 14 is in turn provided with a number of insulating risers 18 supporting a piezo-electric crystal mounting constituted by a bottom electrode 20, a crystal 22 and a top electrode 24. The crystal mounting may be of standard design and be provided with thumb-screws 26 for regulating the air gap above the crystal. Shielded potential-leads 28 and 30 extend respectively from the bottom electrode 20 and the top electrode 24 through the metal base 14 to outwardly extending socket plugs 32 and 34 fixed to the lower base 10.

The crystal and the supports therefor are enclosed in a metal cabinet 36 which surrounds the assembly and is fixed at its lower extremity to the metal base 14 as by means of screws 38. This inner base 14 is grounded by means of a wire not shown, connected to prong 42 (Fig. 1). The cabinet is provided with a removable lid 40.

As more clearly shown in Fig. 1 the wall of this cabinet 36 is bent inwardly preferably adjacent one of its corners, as indicated at 44, to accommodate a thermo-regulator of any suitable type but which is preferably in the form of an elongated glass tube 46. A curved sheet of metal 48 surrounds the tube 46 on its outer side: this sheet is fixed to the wall of the cabinet 36 as by rivets 50, thus the thermo-regulator 46 may be said to be accommodated in a "well" in the wall of the cabinet 36. An electrical insulator in the form of a sheet or strip 52 is wrapped about the outer wall of the cabinet 36 and this sheet 52 is wound with an enameled wire grid or heater-coil 54.

The terminals of heater-coil 54 are connected in series with the thermo-regulator 46, as in standard practice, and current applied thereto through socket prongs 56, Fig. 1—58, Fig. 2 on the base 10. An additional prong 60 (making six in all) is provided for connection to the point where the coil 54 and the thermo-regulator 46 are connected in series. When so arranged a remote pilot lamp or other device (not shown) may be bridged across terminals 56 and 60 for indicating whether the heating current is on or off.

An outer casing 62 is removably fixed to the lower base 10, as by screws 64; it completely encloses the inner cabinet 36 and its appurtenances.

The improved operating characteristics of the constant temperature cabinet of the present invention may be attributed in large part to the fact that an "ambient thermal compensator" is provided to ensure that operation of the thermo-regulator 46 shall be dependent directly, rather than indirectly upon changes in the thermal ambient.

This compensator is preferably in the form of a strip of steel 66 or other heat conducting substance, placed in the well contiguous the thermo-regulator 46 and insulated from the inner wall of the well by a ribbon 68 of felt or the like. Strip 66 is bent outwardly at the bottom in the form of an L to pass under the lower rim of the wall of the inner cabinet 36, and is secured, as by means of a screw 70 to a metal lug 72 which fits snugly in the corner of the base 10 contigous the inner surface of the outer casing 62. When assembled screws 74 clamp the outer casing 62 to this lug 72.

Figure 4:
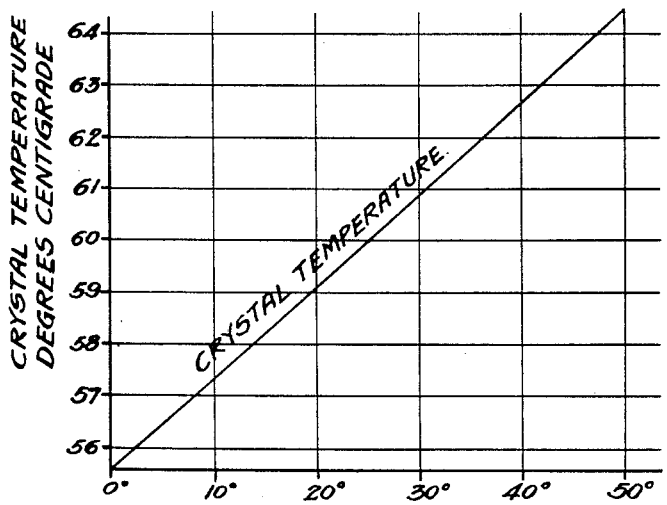
Figure 5:
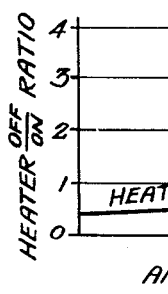

The operation of the device of the present invention will be best understood when it is recalled that in any cabinet assembly where leads must be brought out heat will escape by conduction through the leads. The quantity of heat escaping is, of course, proportional to the ambient temperature, i. e., the lower the ambient temperature the greater the amount of escaping heat. The practical effects of this loss of heat where no effort is made to compensate for the loss are shown in the charts of Figs. 3, 4 and 5 which are derived from laboratory tests of the device of Figs. 1 and 2 with the ambient thermal compensator (66) removed.

In Fig. 3 lines $a$, $b$ and $c$ are temperature gradient lines, at ambient temperatures of 0° C., 35° C. and 50° C., respectively, between the ambient wall (outer casing 62) and the control wall (i. e., the heater wall 36 in which the thermo-regulator 46 is incorporated). Lines $a'$, $b'$, $c'$ are extended temperature gradient lines from the control wall to the crystal and, when read with lines $a$, $b$ and $c$, show that as the temperature of the ambient increases, the temperature of the crystal likewise increases instead of remaining constant at the desired temperature of 60° C. Stated another way the temperature of the crystal tends to follow the temperature of the ambient because, as indicated by the change of slope in the gradient, the thermal losses from within the inner cabinet do not follow the ambient temperature in a desired ratio. This is so because at higher ambient temperatures heat is dissipated at a slower rate than it is at lower temperatures. Thus, assuming the temperature exterior of the outer casing to be 0° C. and, referring to line $a$; now the temperature adjacent the control wall is 60° C. but the temperature adjacent the crystal may be only 55°, (line $a'$) because heat is being dissipated rapidly therefrom if for no other reason than the fact that the terminals of the necessary electric leads thereto are substantially that of the ambient i. e., 0° C. Now if the ambient temperature adjacent these terminals is 35° C., (referring to line $b$,) or 50° C. (referring to line C.,) and the temperature at the control wall is nevertheless maintained at 60° C., obviously, heat from the region about the crystal will not be dissipated as rapidly as it was when the external temperature was 0° C., as a consequence the crystal will be maintained at different temperatures in each instance even though the thermostat is operating perfectly to maintain the control wall at 60° C. In actual tests, with the compensator removed, the temperature of the crystal was found to vary more than 8° C. for a 50° C. change in temperature of the ambient. This departure is indicated in Fig. 4. During the course of this change the off-on heater ratio was that shown in Fig. 5.

The charts of Figs. 6, 7 and 8 represent thermal characteristics of the complete unit of Figs. 1 and 2, i. e., with the ambient thermal compensator strip 66 connected in heat transfer relation with the thermo-regulator 46 and the ambient or outer casing wall 62. Here the compensator strip permits heat to be dissipated from the region about the thermostat in the control wall in quantities and at a rate such as to compensate for the changes in heat dissipation caused by the uneven rate at which heat is lost from the region about the crystal at different ambient temperatures. Thus, with the strip in place and the temperature of the ambient at 0° C. heat will be dissipated rapidly from the region of the thermostat; this results in the thermostat operating to keep the heater about the control wall turned on substantially all of the time (see Fig. 8) so that as a consequence the temperature at the control wall may rise to, say, 65° C. Now having in mind that heat is being lost from the region about the crystal at the same rate, (for a 0° ambient) with the strip in place (line $1a'$ Fig. 6) as it was with the strip removed (line $a'$ Fig. 3) it will be apparent that the heat represented by the additional 5° C. supplied adjacent the control wall will exactly compensate for the 5° C. lost adjacent the crystal. As shown in Fig. 6 when the thermal compensator strip is of the proper mass to ensure correct thermal conduction between the ambient wall and the thermo-regulator, the slope of the respective thermal gradient lines $1a$, $1b$ and $1c$ is such that the extension $1a'$, $1b'$, $1c'$ thereof converge at substantially exactly the same temperature point, in this case 60° C., which is the desired crystal temperature. The actual overall departure from the desired temperature will be seen, by reference to Fig. 7, to be appreciably less than ½° C. for an ambient variation of 50° C. Fig. 8 shows the off-on heater ratio, a comparison of this chart with that of the chart of Fig. 5 shows clearly the effect that the compensator has upon the performance of the heater.

It is evident that if the ambient thermal compensator strip 66 is of a substance and mass such that the heat dissipated thereby from the region adjacent the thermo-regulator 46 is disproportionately greater or less than the accumulation of losses (as by convection and by conduction through the lead wires) from the region adjacent the crystal, then, "over" or "under" compensation will ensue and the temperature within the inner chamber will be greater or less than that desired. The exact dimensions of the compensator strip will depend upon many factors. A strip of steel 2¾" x ⅜" (curved) and .032" thick was used in the unit tested as above described. The dimensions of the inner chamber were 1½" x 2¾" x 2", and the dimensions of the outer chamber 2" x 4" x 2½". The wall of the inner chamber and of the outer casing are of aluminum, the former being substantially 3/32" thick and the latter 1/16" thick.

It is entirely practical to maintain the crystal within 0.2° C. of the desired temperature with the apparatus above described and, with thermal losses accurately gauged the departure may be 0.1° C. or even less. This assumes that the sensitivity of the thermo-regulator is rated below this figure. An Edison bi-metallic thermostat enclosed in a tube containing hydrogen at an attenuated pressure has been found to possess the desired sensitivity.

As previously set forth, it is preferable to mount the thermo-regulator between the heater and the element which is to be held at a constant temperature. Where, as in the instant case, the inner temperature tends to follow the ambient temperature the compensator is preferably placed between the heater wall and the thermo-regulator, adjacent the regulator on the one side and heat-insulated from the heater wall on the other side. Alternatively the compensator may be placed adjacent the regulator, between the regulator and the object, and heat insulated from the control wall.

In boxes or ovens so designed that the inner temperature tends to decrease with an increase in the temperature of the ambient the compensator is preferably placed between the heater and the ambient wall, adjacent to the heater. In all cases it is assumed that the heater is outside and adjacent to the control wall, and that the compensator is properly connected to the ambient wall.

If desired that portion of the compensator strip which, in the described embodiment is contiguous the thermo-regulator tube, may be incorporated within the tube.

Other modifications will suggest themselves to those skilled in the art. It is to be understood, therefore, that the foregoing is to be interpreted as illustrative and not in a limiting sense except as required by the prior art and by the spirit of the appended claims.

What is claimed is:—

1. A constant temperature cabinet unit comprising an inner chamber, a thermo-regulator mounted contiguous the outer surface of said chamber, means comprising a thin metal sheet for removably maintaining said thermo-regulator in said position, a heater mounted about said outer surface of said chamber and about the outer surface of said metal sheet, an outer casing spaced from said heater, and means comprising a metal strip connecting said casing and thermo-regulator in heat transfer relation for controlling said thermo-regulator in accordance with temperature variations in the ambient surrounding said casing.

2. The invention as set forth in claim 1 and wherein a portion of the wall of said inner chamber is bent inwardly to accommodate said thermo-regulator.

3. A constant temperature cabinet unit comprising an insulating base, an inner metal chamber mounted above said base and an outer metal casing spaced from said chamber and removably fixed to said base, a thermo-regulator mounted intermediate said chamber and casing and contiguous the outer surface of said chamber, a heater about said chamber and thermo-regulator, a metal strip positioned contiguous said thermo-regulator and extending downwardly toward said base, a block of metal secured to said base contiguous the inner surface of said casing and to which said metal strip is secured, said metal strip and block constituting a heat transfer connection between said outer casing, when it is in position on said base, and said thermo-regulator.

4. The invention as set forth in claim 3 wherein a portion of the outer wall of said chamber is bent inwardly to accommodate said thermo-regulator and a thin metal sheet is provided for removably supporting said thermo-regulator contiguous said inwardly bent portion of said wall.

SAMUEL A. BOKOVOY.